Patented Dec. 2, 1947

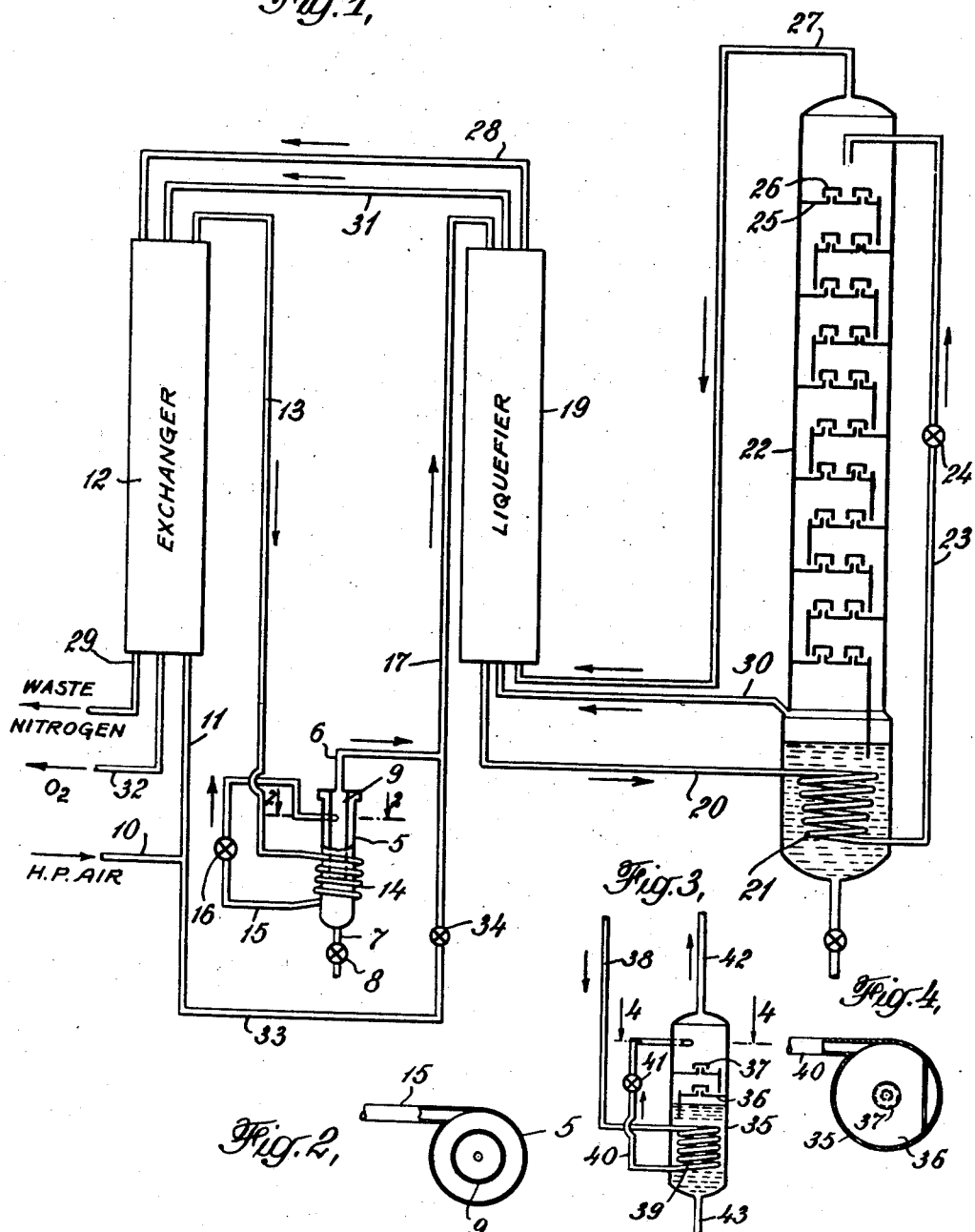

2,431,866

UNITED STATES PATENT OFFICE 2,431,866

SEPARATION OF THE CONSTITUENTS OF GASEOUS MIXTURES

Wolcott Dennis, Stamford, Conn., assignor to Air Reduction Company, Incorporated, New York, N. Y., a corporation of New York Application March 21, 1944, Serial No. 527,418

12 Claims. (Cl. 62—175.5)

This invention relates to the separation of the constituents of gaseous mixtures by liquefaction and rectification and particularly to the removal of impurities present in the gaseous mixture without resort to chemical treatment. While intended primarily for use in the treatment of air, it may be utilized in the recovery of the constituents of other gaseous mixtures.

One of the problems in the recovery of oxygen, nitrogen, etc., from the atmosphere results from the presence of carbon dioxide in the air treated. Since carbon dioxide congeals at the low temperatures employed, it interferes with the operation unless removed. It is customary to subject the air to treatment in large caustic towers to remove the carbon dioxide. This introduces considerable expense and other difficulties. Oil and hydrocarbon derivatives are introduced in the compressors employed to raise the pressure of the air, and since such compounds are not readily removable from the air, they accumulate in the system and find their way into the products.

Several methods have been proposed for the removal of such impurities by allowing them to freeze out in the cold parts of the liquefaction apparatus as particles suspended in the in-going gas streams and subsequently filtering out the solid particles or collecting them in a liquid phase in the lower end of a scrubber. The impurities are then discharged from time to time as required. However, since some liquid must be supplied to the rectification column to neutralize losses of cold due to heat leak and to make up for any liquid withdrawn, it has been necessary to resort to various more or less complicated schemes to produce a clean liquid which can be supplied to the column for this purpose.

Merely filtering the impure liquid to remove solids is not satisfactory as the materials in solution are obviously not filterable. In some of the proposed methods the impure liquid is concentrated by first reducing its pressure and then condensing a purified vapor phase at a higher pressure by heat transfer to the impure liquid. These methods usually lead to considerable complication of apparatus and controls. Other methods proposed for air vaporize the impure liquid by condensing oxygen product from the final air rectification, which causes a loss of rectification efficiency because potential liquid air reflux is evaporated and made unavailable to the rectification.

It is the object of the present invention to provide a simple, economical and effective method of removing impurities such as those mentioned from a gaseous mixture such as air which is to be subjected to separation by liquefaction and rectification for the purpose of separating the constituents.

Other objects and advantages of the invention will be apparent as it is better understood by reference to the following specification and the accompanying drawing, in which Fig. 1 is a diagrammatic illustration of an apparatus suitable for the practice of the invention;

Fig. 2 is a section on the line 2—2 of Fig. 1;

Fig. 3 is a diagrammatic view illustrating a modification of the invention; and

Fig. 4 is a section on the line 4—4 of Fig. 3.

I have discovered that solidified particles of carbon dioxide, residual moisture, oil and other hydrocarbons may be separated readily from a gaseous mixture, such as air entering the liquefaction system, by an initial expansion of the compressed gaseous mixture after it has been cooled to a temperature sufficiently low to insure partial liquefaction. I have also discovered that in an apparatus of the type illustrated in Figs. 1 and 3, sufficient liquid may be formed by exchange of heat between the vapor phase leaving the separator and the outgoing products of the rectification, to supply the refrigeration requirements of the rectification column. The amount of liquid thus formed varies according to the pressure maintained in the separator and by properly controlling this pressure a balanced operating condition results in the final rectification. Ordinarily the pressure maintained in the separator is such that approximately 25% of the gaseous mixture will be liquified. The initial air pressure is controlled to regulate the amount of excess liquid formed in the separator for withdrawal which usually amounts to about 1% of the gaseous mixture treated. To insure the presence of a liquid phase in the stream entering the separator and to concentrate the liquid in the separator means are provided for the exchange of heat between the high pressure air before expansion and the liquid and vapor in the separator. This heat transfer is designed to reduce the high pressure air temperature to about −135° C. depending on the initial pressure employed which in the case of the apparatus illustrated in Figs. 1 and 3 would be 50 to 100 atmospheres. Lower or higher temperatures may be maintained, as for example between −120° and −160° C.

The separator in Fig. 1 is shown equipped with a filter element through which the vapor phase leaves the separator. This is an additional safeguard against carrying over of solid particles and is particularly useful on starting up when solid particles may form before partial liquefaction occurs.

The rectification column may be single or double rectification type. In order to achieve a balance between the liquid supplied to the rectification column and its losses, the separator pressure is carried at any required pressure between the critical pressure of the entering gas mixture and its condensing pressure in the coil at the bottom of the column. For air this is from 37 atmospheres to about 5 atmospheres absolute. The higher this pressure is, the greater the liquid supplied to the column becomes, providing the initial pressure is carried sufficiently high to insure the presence of liquid in the separator.

Referring to Fig. 1 of the drawing, 5 indicates a separator of any suitable form and construction adapted to withstand the pressure to which it may be subjected. It is provided with an outlet 6 for vapor and at the bottom with a purge 7 controlled by a valve 8. A filter 9 is disposed within the separator 5 to prevent escape of solid particles through the outlet 6 in starting the operation or as the result of overfilling of the separator with liquid.

The entering gaseous mixture, after compression to the desired pressure, drying in the usual equipment to remove substantially all of the moisture and initial cooling, is introduced through a pipe 10 and delivered by a pipe 11 to an exchanger 12 through which it passes in heat exchange relation with gaseous products of the separation. It passes through a pipe 13 to a coil 14 surrounding the separator 5, so that the gaseous mixture is further cooled by heat exchange with liquid accumulated in the separator 5. A pipe 15, provided with an expansion valve 16, delivers the gaseous mixture to the separator 5 through an inlet which, as indicated in Fig. 2, gives the mixture of vapor and liquid particles a tangential direction in the separator. The liquid particles coalesce and collect in the bottom of the separator where the liquid is partially vaporized by heat exchange with the gaseous mixture in the coil 14. The vapor escapes through the outlet 6 and is delivered to a pipe 17.

The pipe 17 is connected to a liquefier 19 in which the vapor is subjected to heat exchange with cold products of the separation and thus partially liquefied. The liquid and remaining vapor is delivered through a pipe 20 to a coil 21 in the bottom of a liquefier 22 where it is surrounded by a liquid product of the separation. The liquid is delivered from the coil 21 through a pipe 23 and expansion valve 24 to the top of the rectifier 22 and flows downwardly over trays 25 having bubble caps 26. As the result of rectification, the effluent consisting essentially of nitrogen, in the event that air is treated, escapes through a pipe 27 and is delivered to the liquefier 19. After giving up a part of its cold to the vapor entering through the pipe 17, the nitrogen is withdrawn through a pipe 28 and delivered to the exchanger 12 where the remaining cold is utilized in cooling the entering gaseous mixture. The nitrogen escapes through a pipe 29.

Vapor, consisting essentially of oxygen, is withdrawn through a pipe 30 and after passing through the liquefier 19 is delivered through a pipe 31 to the exchanger 12. It is withdrawn through the pipe 32 and may be delivered to any suitable storage receptacle.

The rectification as illustrated is a simple rectification. Instead, I may employ double rectification in which a reflux nitrogen liquid is provided and delivered to the top of the rectification to effect more efficient separation of the nitrogen and oxygen constituents of air.

To effect removal of any solid constituents which may accumulate on the filter 9, a pipe 33 controlled by valve 34 is connected to the pipe 10. By opening the valve 34 and closing the valve 16, the high pressure air may be directed outwardly through the filter 9. By opening the valve 8, the contents of the separator 5 may be purged.

In Fig. 3, the separator 5 is replaced by a separator 35 having trays 36 and bubble caps 37. The gaseous mixture, after compression and initial cooling as in the preceding embodiment of the invention, is delivered through a pipe 38 to a coil 39 submerged in liquid within the separator 35. It passes through a pipe 40 and pressure reducing valve 41 to an inlet which, as shown in Fig. 4, is disposed tangentially to introduce the vapor and liquid particles so that they are subjected to centrifugal action. The liquid particles separate and flow downwardly over the trays 36, of which any suitable number may be used. The liquid is partially vaporized by heat exchange with the gaseous mixture in the coil 39, and the vapor rises through the trays 36. This vapor, with the unliquefied residue, escapes through the pipe 42 and is thereafter subjected to liquefaction and separation of the constituents in the manner described in connection with the embodiment of the invention shown in Fig. 1. The residue of liquid containing the impurities is discharged from time to time through a purge 43 controlled by a valve 44. Except for the modification of the separator, the procedure is substantially as previously described.

The improved method affords an extremely simple and effective separation of carbon dioxide and other impurities which have freezing points above the temperature prevailing in the separator. The solid particles produced cannot escape and contaminate the gaseous residue and vapor which passes on to the liquefaction and rectification. Similarly, oil and hydrocarbons concentrate in the liquid residue which is withdrawn from time to time from the separator. Hence these materials cannot escape to and accumulate in the rectifier. The procedure avoids the complicated apparatus and operations which have been utilized or suggested heretofore with the intention of accomplishing the purpose of the present invention.

Various changes may be made in the details of procedure and in the apparatus employed without departing from the invention or sacrificing the advantages thereof.

I claim:

1. In the method of separating the constituents of a gaseous mixture by liquefaction and rectification, the improvement consisting of partially expanding a compressed and cooled gaseous mixture to form a relatively small proportion of liquid in which the impurities accumulate, discharging from the system the liquid containing the impurities and subjecting the balance of the gaseous mixture to liquefaction by heat exchange with the gaseous products of the rectification.

2. In the method of separating the constituents of a gaseous mixture by liquefaction and rectification, the improvement consisting of partially expanding a compressed and cooled gaseous mixture to a pressure between 5 and 37 atmospheres absolute to form a relatively small proportion of liquid in which the impurities accumulate, separating the liquid from the balance of the gaseous mixture, discharging from the system the liquid containing the impurities and subjecting the balance of the gaseous mixture to liquefaction by heat exchange with the gaseous products of the rectification.

3. In the method of separating the constituents of a gaseous mixture by liquefaction and rectification, the improvement consisting of partially expanding a compressed and cooled gaseous mixture to form a relatively small proportion of liquid in which the impurities accumulate, separating the liquid from the balance of the gaseous mixture, discharging from the system the liquid containing the impurities and subjecting the balance of the gaseous mixture to liquefaction by heat exchange with the gaseous products of the rectification.

4. In the method of separating the constituents of a gaseous mixture by liquefaction and rectification, the improvement consisting of partially expanding a compressed and cooled gaseous mixture to a pressure between 5 and 37 atmospheres absolute to form a relatively small proportion of liquid in which the impurities accumulate, separating the liquid from the balance of the gaseous mixture, partially vaporizing the liquid to concentrate the impurities therein, discharging from the system the liquid containing the impurities and subjecting the balance of the gaseous mixture to liquefaction by heat exchange with products of the rectification.

5. In the method of separating the constituents of a gaseous mixture by liquefaction and rectification, the improvement consisting of partially expanding a compressed gaseous mixture at a temperature of between −120° and −160° C. to form a relatively small proportion of liquid in which the impurities accumulate, discharging from the system the liquid containing the impurities and subjecting the balance of the gaseous mixture to liquefaction by heat exchange with the gaseous products of the rectification.

6. In the method of separating the constituents of a gaseous mixture by liquefaction and rectification, the improvement consisting of partially expanding a compressed gaseous mixture at a temperature of between −120° and −160° C. to form a relatively small proportion of liquid in which the impurities accumulate, partially vaporizing the liquid to concentrate the impurities therein, discharging from the system the liquid containing the impurities and subjecting the balance of the gaseous mixture to liquefaction by heat exchange with the gaseous products of the rectification.

7. In the method of separating the constituents of a gaseous mixture by liquefaction and rectification, the improvement consisting of partially expanding a compressed gaseous mixture at a temperature of approximately −135° C. to form a relatively small proportion of liquid in which the impurities accumulate, separating the liquid from the balance of the gaseous mixture, discharging from the system the liquid containing the impurities and subjecting the balance of the gaseous mixture to liquefaction by heat exchange with the gaseous products of the rectification.

8. In the method of separating the constituents of a gaseous mixture by liquefaction and rectification, the improvement consisting of partially expanding a compressed gaseous mixture at a temperature of approximately −135° C. to form a relatively small proportion of liquid in which the impurities accumulate, separating the liquid from the balance of the gaseous mixture, partially vaporizing the liquid to concentrate the impurities therein, discharging from the system the liquid containing the impurities and subjecting the balance of the gaseous mixture to liquefaction by heat exchange with the gaseous products of the rectification.

9. In the method of separating the constituents of a gaseous mixture by liquefaction and rectification, the improvement consisting of expanding a compressed and cooled gaseous mixture to a pressure between 5 and 37 atmospheres absolute thereby causing liquefaction of a fraction of the gaseous mixture, partially vaporizing the liquid produced, discharging from the system the residual liquid and subjecting the balance of the gaseous mixture to liquefaction by heat exchange with the products of the rectification.

10. In the method of separating the constituents of a gaseous mixture by liquefaction and rectification, the improvement consisting of expanding a compressed and cooled gaseous mixture at a temperature of between −120° and −160° C. to a pressure between 5 and 37 atmospheres absolute which will result in liquefaction of approximately 25 per cent of the gaseous mixture, partially vaporizing the liquid produced, discharging from the system the residual liquid and subjecting the balance of the gaseous mixture to liquefaction by heat exchange with the gaseous products of the rectification.

11. In the method of separating and recovering the constituents of a gaseous mixture including liquefaction thereof and rectification of the liquid, the improvement consisting of cooling a portion of a stream of a compressed gas by heat exchange with liquid produced by previous expansion of another portion thereof, expanding the cooled gas to a pressure intermediate the initial pressure and the rectification pressure thereby causing partial liquefaction of the expanded gas, separating the vapor phase from the liquid phase in which impurities accumulate, discharging from the system the liquid phase containing impurities, liquefying a portion of the vapor phase by heat exchange with the products of the rectification and passing the resulting liquid and vapor to the rectification.

12. In the method of separating and recovering the constituents of a gaseous mixture including liquefaction thereof and rectification of the liquid, the improvement consisting of cooling a portion of a stream of a compressed gas by heat exchange with liquid produced by previous expansion of another portion thereof, expanding the cooled gas to a pressure between 5 and 37 atmospheres absolute thereby causing partial liquefaction of the expanded gas, separating the vapor phase from the liquid phase in which impurities accumulate, discharging from the system the liquid phase containing impurities, liquefying a portion of the vapor phase by heat exchange with the products of the rectification and passing the resulting liquid and vapor to the rectification.

WOLCOTT DENNIS.

REFERENCES CITED

The following references are of record in the file of this patent:

UNITED STATES PATENTS

| Number | Name | Date |
| --- | --- | --- |
| 2,287,137 | Ross | June 23, 1942 |
| 2,287,158 | Yendall | June 23, 1942 |
| 2,327,459 | Rice | Aug. 24, 1943 |
| 2,337,474 | Kornemann et al. | Dec. 21, 1943 |
| 2,316,056 | De Baufre | Apr. 6, 1943 |